No. 722,386. PATENTED MAR. 10, 1903.
O. SCHOTT.
METHOD OF MANUFACTURING HOLLOW GLASS BODIES.
APPLICATION FILED AUG. 6, 1902.
NO MODEL.
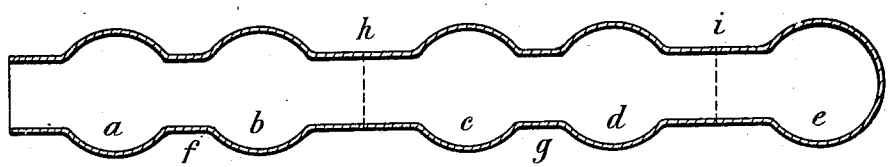
Witnesses:
Emil Donitz
Paul Kruger
Inventor:
Otto Schott

UNITED STATES PATENT OFFICE.

OTTO SCHOTT, OF JENA, GERMANY, ASSIGNOR TO SCHOTT & GEN, OF JENA, SAXE-WEIMAR, GERMANY, A FIRM.

METHOD OF MANUFACTURING HOLLOW GLASS BODIES.

SPECIFICATION forming part of Letters Patent No. 722,386, dated March 10, 1903.

Application filed August 6, 1902. Serial No. 118,627. (No model.)

*To all whom it may concern:*

Be it known that I, OTTO SCHOTT, a subject of the Grand Duke of Saxe-Weimar, residing at 5 Lichtenhainerstrasse, Jena, in the Grand Duchy of Saxe-Weimar, German Empire, have invented a new and useful Method of Manufacturing Hollow Glass Bodies, of which the following is a specification.

The object of the invention is to cheapen the manufacture of hollow glass bodies having thin walls and bottom, but being too large to be produced from cylindrical tubes by means of the blowpipe-flame. For manufacturing glass bodies of this description—jars, bulbs for incandescent lamps, &c.—hitherto each single body has been blown either separately or in one piece with a hollow article open at both ends in a mold from metal gathered out of the glass-furnace. To blow simultaneously two different articles in one mold is only practicable in case equal quantities of both articles are required, so that ordinarily one single body of the kind referred to is to be blown, and the amount of furnace labor spent for each body is very high. This very expensive furnace labor is so considerably reduced by the present invention that in spite of an additional work with the blowpipe comprised in the new method of manufacture the above object of the invention is fully realized.

According to the invention a twofold or generally manifold body is blown at the furnace in such a mold that the component bodies are arranged in pairs, the bottoms of each pair lying adjacent to each other and being connected by a short central tube. This tube is contracted and divided with the aid of the blowpipe, so as to close the central part of each bottom. The shaping of this central part of the bottom may be facilitated by well-known means—as, for instance, by blowing air into the glass body or by applying a shaping-tool.

The accompanying drawing shows a longitudinal section of a glass body blown according to the first part of the invention. This manifold body comprises two pairs of globular component bodies, one pair, *a b*, being connected by the tube *f*, and the other pair, *c d*, by the tube *g*. The manifold body is shown to have been blown, not, as usually, with a waste bottom, but with a globular body *e*, which differs from the component bodies *a, b, c*, and *d* only by the central part of the bottom being already closed. The manifold body after being blown, as shown, is separated at the sections *h* and *i*. (Indicated by dotted lines.) Then the tubes *f* and *g* of the pairs *a b* and *c d* are dealt with at the blowpipe-flame, so as to divide each pair into two bodies similar to the body *e*. This work requires no further explanation, as it is the same as in the well-known manufacture of glass vessels from cylindrical tubes.

What I claim as my invention, and desire to secure by Letters Patent, is—

A method of manufacturing hollow glass bodies which consists in blowing a manifold glass body, the components of which are arranged in pairs, with the two bottoms adjacent to each other and connected by a short central tube, and then contracting and dividing the said tube with the aid of heat so as to close the central part of each bottom.

In testimony whereof I have signed my name to this specification in the presence of two subscribing witnesses.

OTTO SCHOTT.

Witnesses:
 EMIL DÖNITZ,
 WILLY DEMUTH.